United States Patent
Gopalan et al.

(10) Patent No.: US 10,719,777 B2
(45) Date of Patent: Jul. 21, 2020

(54) OPTIMIZATION OF MULTIPLE SERVICES VIA MACHINE LEARNING

(71) Applicant: AT&T Intellectual Property I, L.P., Atlanta, GA (US)

(72) Inventors: Raghuraman Gopalan, Union City, CA (US); Lee Begeja, Gillette, NJ (US); David Crawford Gibbon, Lincroft, NJ (US); Zhu Liu, Marlboro, NJ (US); Yadong Mu, Middletown, NJ (US); Bernard S. Renger, New Providence, NJ (US); Behzad Shahraray, Holmdel, NJ (US); Eric Zavesky, Austin, TX (US)

(73) Assignee: AT&T Intellectual Propery I, L.P., Atlanta, GA (US)

( * ) Notice: Subject to any disclaimer, the term of this patent is extended or adjusted under 35 U.S.C. 154(b) by 129 days.

(21) Appl. No.: 15/222,653

(22) Filed: Jul. 28, 2016

(65) Prior Publication Data
US 2018/0034921 A1 Feb. 1, 2018

(51) Int. Cl.
*H04L 29/08* (2006.01)
*G06N 99/00* (2019.01)
(Continued)

(52) U.S. Cl.
CPC ............. *G06N 20/00* (2019.01); *H04L 41/00* (2013.01); *H04L 47/20* (2013.01)

(58) Field of Classification Search
CPC ......................................................... H04L 67/16
See application file for complete search history.

(56) References Cited

U.S. PATENT DOCUMENTS

| 6,505,244 B1 | 1/2003 | Natarajan et al. |
| 6,523,166 B1 | 2/2003 | Mishra et al. |

(Continued)

FOREIGN PATENT DOCUMENTS

| CA | 2803661 | 12/2011 |
| CN | 105260835 | 10/2015 |

(Continued)

OTHER PUBLICATIONS

Huebscher, Markus C., and Julie A. McCann. "A survey of autonomic computing-degrees, models, and applications." ACM Computing Surveys (CSUR) 40.3 (2008): 7. http://www.cs.colostate.edu/saxs/se/AutonomicComputing.pdf.

(Continued)

*Primary Examiner* — Nicholas R Taylor
*Assistant Examiner* — Sanjoy Roy

(57) ABSTRACT

A method, computer-readable medium, and apparatus for modeling data of a service for providing a policy are disclosed. For example, a method may include a processor for generating a first policy for a first service by a first policy model using machine learning for processing first data of the first service, determining whether the first policy is to be applied to a second service, applying the first policy to the second service when the first policy is deemed to be applicable to the second service, wherein the applying the first policy provides the first policy to a second policy model using machine learning for processing second data of the second service, generating a second policy for the second service, and implementing the second policy in the second service, wherein the first service and the second service are provided by a single service provider.

20 Claims, 4 Drawing Sheets

(51) Int. Cl.
*G06N 20/00* (2019.01)
*H04L 12/24* (2006.01)
*H04L 12/813* (2013.01)

(56) References Cited

U.S. PATENT DOCUMENTS

| | | |
|---|---|---|
| 6,577,597 B1 | 6/2003 | Natarajan et al. |
| 6,952,401 B1 | 10/2005 | Kadambi et al. |
| 6,973,034 B1 | 12/2005 | Natarajan et al. |
| 6,982,955 B1 | 1/2006 | Marshall et al. |
| 7,248,841 B2 | 7/2007 | Agee et al. |
| 7,346,704 B2 | 3/2008 | Roadknight et al. |
| 7,478,162 B2 | 1/2009 | Roadknight et al. |
| 7,536,373 B2 | 5/2009 | Kelkar et al. |
| 7,822,860 B2 | 10/2010 | Brown et al. |
| 8,117,230 B2 | 2/2012 | Shaji et al. |
| 8,438,248 B2 | 5/2013 | Li et al. |
| 8,473,738 B2 | 6/2013 | Osmolovsky |
| 8,635,175 B2 | 1/2014 | Dieker et al. |
| 8,984,628 B2 | 3/2015 | Mahaffey et al. |
| 9,104,983 B2 | 8/2015 | Shah et al. |
| 9,106,576 B2 | 8/2015 | Lumezanu et al. |
| 2003/0135584 A1* | 7/2003 | Roberts .............. G06F 8/35 709/218 |
| 2004/0071147 A1 | 4/2004 | Roadknight et al. |
| 2005/0172291 A1 | 8/2005 | Das et al. |
| 2005/0256819 A1 | 11/2005 | Tibbs et al. |
| 2006/0020847 A1 | 1/2006 | Oberle et al. |
| 2007/0195806 A1 | 8/2007 | Tomsu et al. |
| 2012/0272160 A1 | 10/2012 | Spivack et al. |
| 2013/0031035 A1* | 1/2013 | Jeanne ............. H04L 41/142 706/12 |
| 2015/0195136 A1 | 7/2015 | Mermoud et al. |
| 2015/0381465 A1 | 12/2015 | Narayanan et al. |
| 2015/0381515 A1* | 12/2015 | Mattson ............. H04L 41/145 707/609 |
| 2016/0026491 A1 | 1/2016 | Razin |
| 2016/0078361 A1 | 3/2016 | Brueckner et al. |
| 2016/0078367 A1 | 3/2016 | Adjaoute |
| 2016/0218949 A1* | 7/2016 | Dasgupta ............. H04L 63/1416 |
| 2016/0248860 A1* | 8/2016 | Dunbar .................... H04L 67/16 |
| 2016/0301582 A1* | 10/2016 | Arndt ..................... H04L 43/04 |
| 2017/0006141 A1* | 1/2017 | Bhadra ................... H04L 67/12 |
| 2017/0019302 A1* | 1/2017 | Lapiotis ................ H04L 41/145 |
| 2017/0111509 A1* | 4/2017 | McGann ............. H04M 3/5233 |
| 2017/0316438 A1* | 11/2017 | Konig ................ G06Q 30/0204 |

FOREIGN PATENT DOCUMENTS

| | | |
|---|---|---|
| DE | 102013008151 | 11/2014 |
| WO | WO 2013/086629 | 6/2013 |

OTHER PUBLICATIONS

Rao, Jia, et al. "VCONF: a reinforcement learning approach to virtual machines auto-configuration." Proceedings of the 6th international conference on Autonomic computing. ACM, 2009. http://www.ece.eng.wayne.edu/~jrao/papers/ICAC09.pdf Disclosing self-optimizing agent dynamically alter the VM settings from other models.

Zhang, Xinwen, et al. "Towards an elastic application model for augmenting the computing capabilities of mobile devices with cloud computing." Mobile Networks and Applications 16.3 (2011): 270-284. https://pdfs.semanticscholar.org/025e/ac0996d7e3c68665bd423f4af0b67b1d7645.pdf.

Aiber, Sarel, et al. "Autonomic self-optimization according to business objectives." Autonomic Computing, 2004. Proceedings. International Conference on. IEEE, 2004. https://www.researchgate.net/profile/Segev_Wasserkrug/publication/4076029_Autonomic_Self-Optimization_According_to_Business_Objectives/links/02bfe5131171ddcd6f000000.pdf.

Moser, Thomas, et al. "Semantic service matchmaking in the ATM domain considering infrastructure capability constraints." Canadian Semantic Web. Springer US, 2010. 133-157. https://scholar.google.com/scholar?cluster=14445584099630449901&hl=en&as_sdt=1,47#.

\* cited by examiner

OPTIMIZATION OF MULTIPLE SERVICES VIA MACHINE LEARNING

The present disclosure relates generally to methods, computer-readable media and apparatuses for optimizing a service, e.g., generating and implementing a new policy for the service.

BACKGROUND

It is challenging to ensure that customers are satisfied with a given service on an on-going basis due to ever changing conditions. For example, a network service provider may provide a cellular service, but changing conditions may occur, e.g., a network component may fail, a new bandwidth requirement may impact the overall quality of service, a new popular software application may require additional bandwidth from the underlying cellular network as large number of subscribers begin using the new software application, and the like.

SUMMARY

In one example, the present disclosure discloses a method, computer-readable medium, and apparatus for modeling data of a service for providing a policy are disclosed. For example, a method may include a processor for generating a first policy for a first service by a first policy model using machine learning for processing first data of the first service, determining whether the first policy is to be applied to a second service, applying the first policy to the second service when the first policy is deemed to be applicable to the second service, wherein the applying the first policy provides the first policy to a second policy model using machine learning for processing second data of the second service, generating a second policy for the second service, and implementing the second policy in the second service, wherein the first service and the second service are provided by a single service provider.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
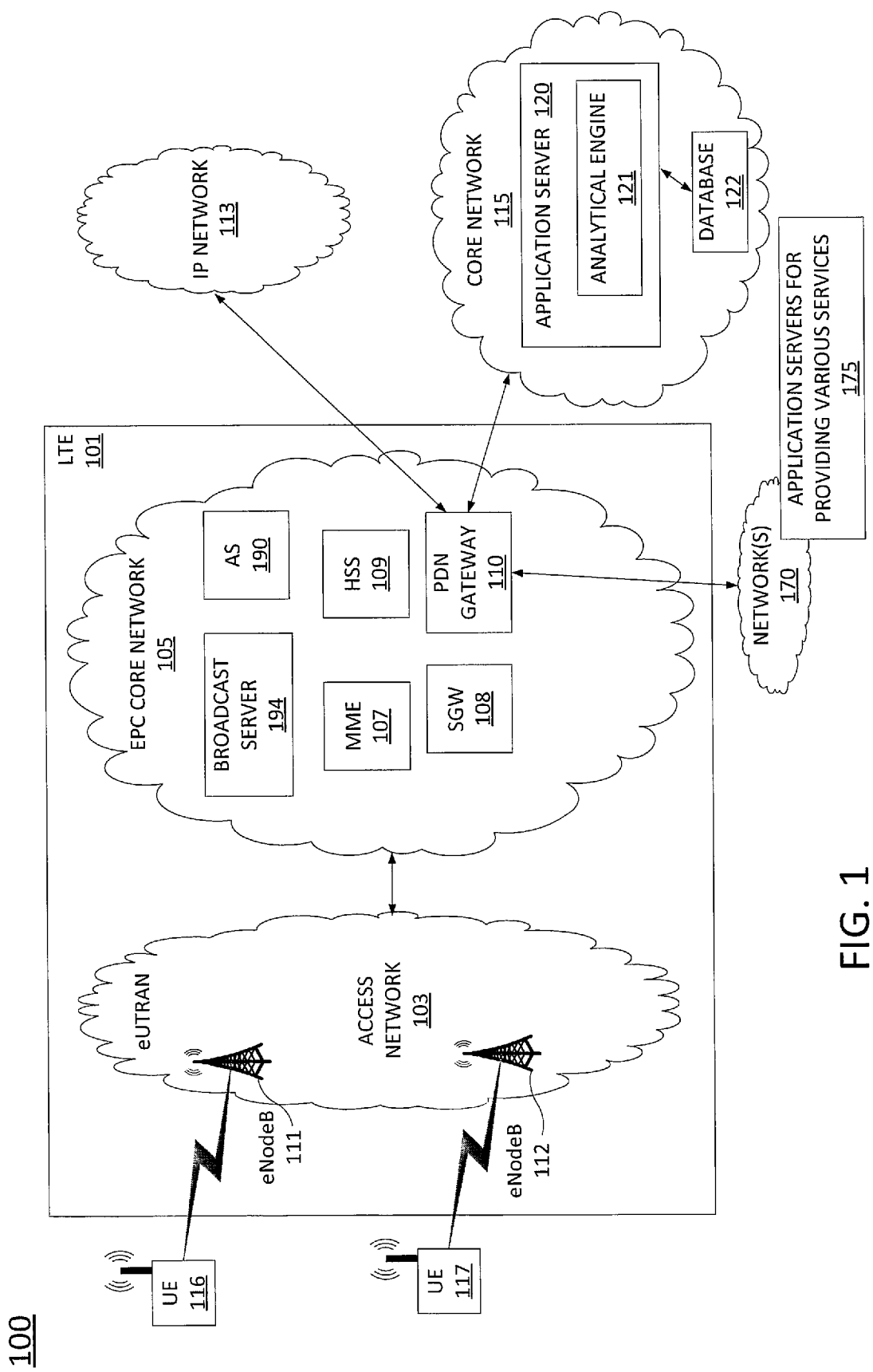
FIG. 1 illustrates an example system related to the present disclosure.

The present disclosure broadly discloses methods, computer-readable media and apparatuses for optimizing a service, e.g., generating and implementing a new policy for the service. More specifically, in one embodiment, the new policy is deduced from a first service and then presented to be used by a second service. For example, the new policy is determined automatically through the use of machine learning.

As discussed above, it is challenging to ensure that customers are satisfied with a given service on an on-going basis due to ever changing conditions. For example, a network service provider may provide a cellular service, but is not aware that a changing condition has occurred, e.g., a new popular software application has gone viral, i.e., a very large number of subscribers are all using the new software application at the same time. Unbeknown to the network service provider, there is a sudden surge in demand for additional bandwidth due to this new popular software application. The network service provider may deduce this need eventually through various channels, e.g., customers contacting a customer care center of the network service provider to inquire why the data service is so congested when using the new software application, customers leaving comments on a website of the network service provider with similar concerns or complaints, and the like.

In one embodiment, machine learning can be deployed to continually monitor various data associated with the service such that anomalous patterns can be quickly determined and analyzed. This use of machine learning can be useful to detect and address a new problem or a new need for a resource that the network service provider should address as quickly as possible to ensure customer satisfaction.

Machine learning allows a trained model to learn from and make predictions on data. Machine learning operates by building the model from an example training set of input observations in order to make predictions or decisions expressed as outputs, rather than following static programming instructions. In one embodiment, the present disclosure employs machine learning in predictive analytics, e.g., to discover "new insights" through learning from historical relationships and trends in the data. Machine learning tasks may encompass different categories of learning, e.g., supervised learning (having access to labelled data), unsupervised learning (having no access to labelled data), semi-supervised learning (having limited access to labelled data), and reinforcement learning. It should be noted that any number of different machine learning approaches can be implemented, e.g., support vector machines, clustering analysis, manifold learning, parametric distribution learning, and the like. In one embodiment, reinforcement learning is subsequently used where reinforcement learning focuses on how an agent ought to take actions in an environment so as to maximize a notion of a long-term reward, e.g., customer satisfaction, better performance in terms of speed and efficiency, faster reaction time, lower cost, higher reliability, better security, and the like. Reinforcement learning methods attempt to find a policy that maps "states" (e.g., services in the present disclosure) to the actions that the agent ought to take in those states. Reinforcement learning differs from the supervised learning in that correct input/output pairs are not presented, nor sub-optimal actions explicitly corrected.

However, another aspect to consider is that a service provider, e.g., a network service provider, may engage in providing a plurality of services instead of a single service. For example, a network service provider may provide a landline telephony service (e.g., local phone service, long distance phone service, facsimile service, or Voice over Internet Protocol (IP) service), a cellular service (e.g., cellular phone service), a data service (e.g., broadband access service), a multimedia delivery service (e.g., television, movie or any other programming delivery services), a connected car service (e.g., providing data or cellular service to a customer's vehicle), a connected premises service (e.g., providing data or cellular service to a customer's home or business for managing various aspects of the premises, such as heating, cooling, lighting, security monitoring and the like), and so on. Each of these provided services is quite different from service to service. As such, machine learning can be deployed for each of the services to detect and address its respective new problem or new need for a resource that the network service provider should address as quickly as possible to ensure customer satisfaction.

In one embodiment of the present disclosure, the knowledge acquired through machine learning in one service is used to optimize the performance of another different service. For example, machine learning such as reinforcement learning (RL) is used for resource optimization for a plurality of services of a service provider such that the learnings from individual services can be used to optimally impact the other services. In addition to the increase in overall quality across the multiple services, one additional advantage is the strengthening of the service provider's overall brand. For example, the service provider's overall brand can also be improved due to its consistent response in addressing a problem or need, its consistent timely response (e.g., within one day, within two days and so on) in addressing a problem or need, its consistent response format or modality (e.g., how the response is communicated, e.g., email, text messaging, phone calls, social network postings, and so on) in addressing a problem or need, its consistent method of response (e.g., deploying new resources, providing a credit to customers, providing a free service to customers, sending a technician to troubleshoot the problem and so on) in addressing a problem or need, and so on.

One aspect the present disclosure is that the present embodiments are scalable to address large data analytics with minimal human intervention in terms of identifying one or more new policies, e.g., performance indicators and possible strategies to effect a positive change, to facilitate better user experience, and at the same time reducing cost incurred. Furthermore, adaptive mechanisms can be used that would dynamically learn over time for transferring existing knowledge of one or more services to other services, e.g., existing services or even new services (i.e., services that have yet to be deployed). This could result in a mutually beneficial environment where customers may experience better performance, before even noticing performance issues if any, since the method may use prior knowledge to interpret and predict potential issues/events.

In one embodiment of the present disclosure, the present method provides a cohesive integration of relevant services of a service provider by utilizing machine learning, e.g., Reinforcement Learning (RL), by defining "states" as the different services of a service provider, e.g., such as telephony service, cellular or mobility service, data service, multimedia delivery service, connected car service, connected premises service, and so on. In addition, "actions" can be defined as the drivers of the relevant components pertaining to these states such as actions taken for addressing cost, actions taken for addressing reliability, actions taken for addressing time of delivery, actions taken for addressing customer inquiries or complaints, actions taken for addressing network performance, actions taken for addressing quality of service, and so on. Finally, "policies" are defined that drive the "state-action" space holistically such that the information gathered from all these various services are optimally utilized to define, in turn, a new set of one or more policies that would further maximize a reward to each of the services. The term "reward" is broadly defined to encompass a broad range of possible goals for a service, e.g., increasing performance of a service, reducing operating cost for a service, reducing cost to customers of a service, increasing reliability of a service, increasing security of a service, increasing customer satisfaction for a service, reducing the time to address customer's concerns or complaints, and so on.

To illustrate, different services/states of a service provider will share some set of drivers/actions. Thus, a policy model using machine learning will learn from one state that could impact other states as well. In such a schema, RL may effectively leverage prior information obtained from these state-action spaces to chart out a set of policies that would maximize the reward for the services individually as well as holistically. To further illustrate, an example is where data measurements such as chat emotions, call length and user interaction history can be leveraged usefully for multiple tasks such as customer satisfaction estimation, predicting churn and willingness to recommend. In other words, the results of customer satisfaction estimation, root cause analysis, predicting churn and willingness to recommend are all important aspects of any services, irrespective as to what services are being provided. This example illustrates that these data measurements could have effects across services/products of a single service provider, which when analyzed properly could have a significant impact on the overall brand value of the service provider.

In addition to lowering costs, which would otherwise have been incurred for each service unit performing its own modeling, the present method will help improve customer experience by addressing issues which may have yet to reach a tipping point for the users to file a complaint. In other words, by using the present modeling with machine learning, a potential outlier pattern in one particular service can be preemptively detected from other multiple services prior to the outlier pattern reaching a critical point in the particular service where customer satisfaction will be impacted.

As discussed below, although the present disclosure may initially start with existing data (e.g., used for training) to model existing services and actions in isolation, a machine learning framework such as an RL framework would then subsequently use them at once to output a set of one or more policies that would optimally use the available information to maximize the final reward for a plurality of services. Several advantages are provided by the present disclosure, e.g., the ability to adapt with changing data and the potential addition of new services (and possibly deletion of some existing services), as information contained in the learned policies can be reconfigured. It is also expected that the present disclosure will improve customer experience (e.g., by solving problems before the problems become noticeable) and will reduce cost (e.g., by a holistic treatment across different services). These and other aspects of the present disclosure are described in greater detail below in connection with the discussion of FIGS. 1-4.

To better understand the present disclosure, FIG. 1 illustrates an example network, or system 100 suitable for implementing embodiments of the present disclosure for modeling data of a service for providing a policy. In one example, the system 100 comprises a Long Term Evolution (LTE) network 101, an IP network 113, and a core network 115, e.g., an IP Multimedia Subsystem (IMS) core network. In one example, system 100 is provided and operated by a single network operator or network service provider. FIG. 1 also illustrates various user endpoint devices, e.g., LTE user endpoint devices 116 and 117. The user mobile endpoint devices 116 and 117 may each comprise a cellular telephone, a smartphone, a tablet computing device, a laptop computer, a pair of computing glasses, a wireless enabled wristwatch, or any other cellular-capable mobile telephony, a device deployed in a vehicle, and computing device (broadly, "mobile endpoint devices"). In another embodiment, the user endpoint devices 116 and 117 may be stationary devices, e.g., set top boxes, home gateways, security panels at a premises, home appliances, Internet of Things (IoT) sensors, and the like. For the purposes of providing illustrated examples, endpoint devices 116 and 117 will be deemed to be mobile devices in various examples discussed below, but it should be noted that endpoint devices 116 and 117 can be both mobile devices and/or stationary devices.

In one embodiment, each of the user mobile endpoint devices is capable of executing one or more mobile software applications, e.g., software applications for transmitting and/or receiving multimedia content, gaming, shopping, surfing the web, sending and receiving data, sending and receiving messages such as emails and text messages, implementing call sessions such as voice over IP calls, video conferencing, and the like.

In one example, the LTE network 101 comprises an access network 103 and a core network 105. In one example, the access network 103 comprises an evolved Universal Terrestrial Radio Access Network (eUTRAN). The eUTRANs are the air interfaces of the $3^{rd}$ Generation Partnership Project (3GPP) LTE specifications for mobile networks. In one example, the core network 105 comprises an Evolved Packet Core (EPC) network. An EPC network provides various functions that support wireless services in the LTE environment. In one example, an EPC network is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, LTE user equipment or user endpoints (UE) 116 may access wireless services via the eNodeB 111 and the LTE UE 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

The EPC network 105 may also include an application server (AS) 190. In one embodiment, AS 190 may comprise a computing system, such as computing system 400 depicted in FIG. 4, and may be configured to provide one or more functions (e.g., implementing a policy model) for modeling mobile traffic for providing a policy, and for performing various other operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. In addition, AS 190 may be configured to receive requests to implement one or more actions or functions as discussed below after modeling mobile traffics using machine learning. For example, a policy model employing machine learning (broadly an analytic engine) can be implemented in AS 190 for processing mobile traffic. AS 190 may be further configured to perform other functions such as those described below in connection with the example methods 200 and 300 of FIGS. 2 and 3.

In one example, AS 190 may be deployed in a network operations center (NOC) of a cellular network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

It should be noted that the LTE network 101 is disclosed to provide a very brief summary description of the underlying framework that is utilized to provide a cellular or mobility service. Similarly, various other networks 170 having respective application servers 175 can also be deployed by a single service provider, e.g., a network service provider in providing a plurality of other services, e.g., telephony services, data services, multimedia delivery services, connected car services, connected premises services, and so on. For clarity reasons, the underlying framework for these other networks 170 are not shown in FIG. 1, but it is understood that a single network service provider is capable of providing two or more of these services.

As such, the foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in core network 115 instead of being deployed within the EPC network 105, or in other portions of system 100 that are not shown, while providing essentially the same functionality. For example, the functionality of AS 190 for a cellular service can be implemented via the application server 120 having an analytical engine 121 utilizing database 122 to store various data associated with the mobile traffic for the cellular service. In fact, in one embodiment the application server 120 is configured as a dedicated policy modeling server for implementing one or more policy models using machine learning to support a plurality of different services offered by the same network service provider. For example, the policy models for a plurality of different services, e.g., telephony services, cellular services, data services, multimedia delivery services, connected car services, and connected premises services, can all be instantiated in the AS 120 (which may encompass a plurality of application servers to handle the large volume service data).

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for modeling mobile traffic for providing a policy. In fact, the above listing of various services should not be deemed to be an exhaustive listing of services. Thus, these and other modifications are all contemplated within the scope of the present disclosure.

The present disclosure uses a method that models a plurality of services (e.g., two of more services) offered by a single service provider, e.g., a single network service provider for providing network based services as discussed above, for identifying one or more policies that should be implemented for across multiple services. In doing so, the present disclosure offers an autonomous method that is capable of leveraging learned patterns in one service to be applied to a different service.

Figure 2:
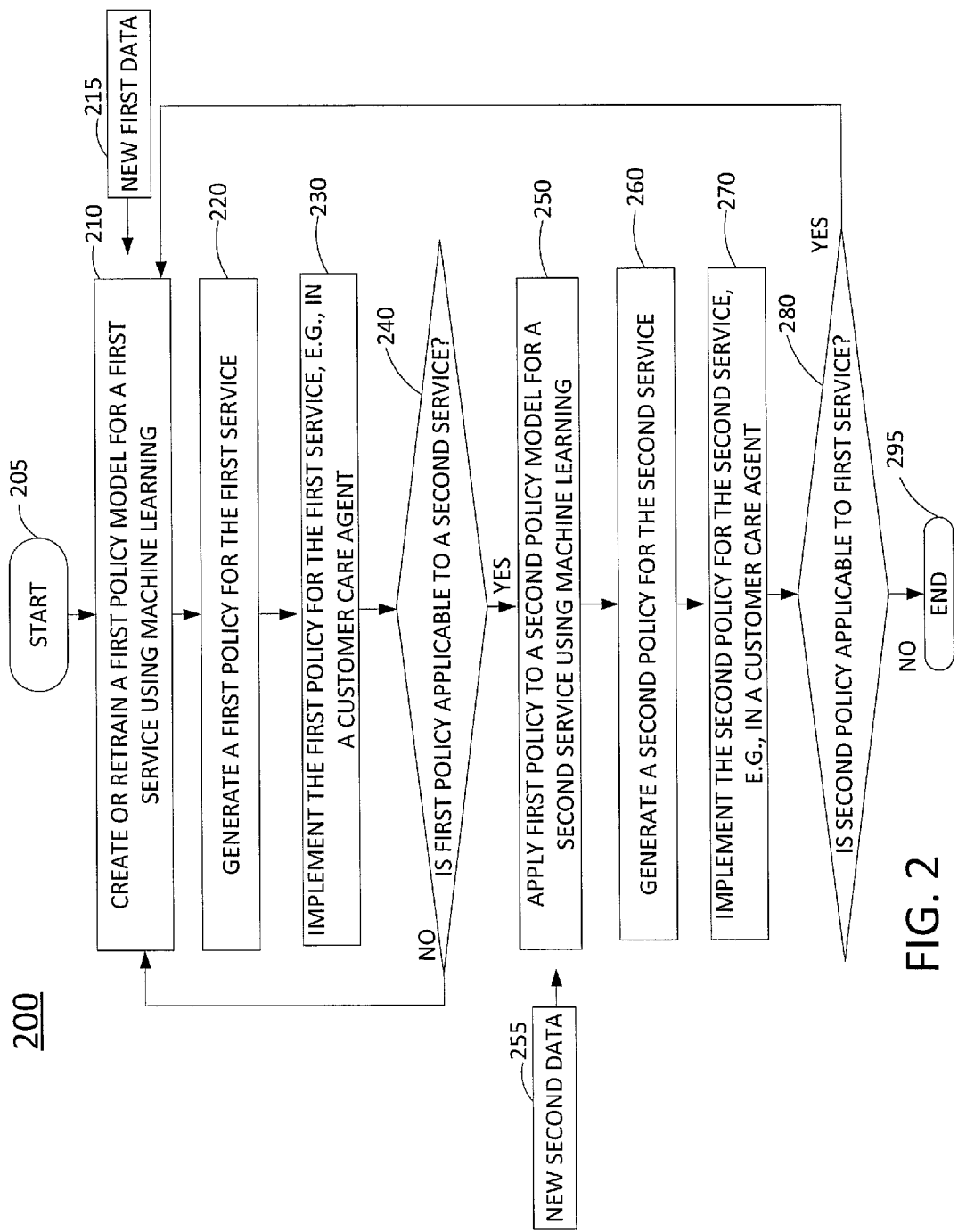
FIG. 2 illustrates a flowchart of an example method for modeling data of a service for providing a policy, according to the present disclosure.

FIG. 2 illustrates a flowchart of an example method 200 for modeling data of a service for providing a policy. In one embodiment, the steps, operations or functions of the method 200 may be performed by any one or more of the components of the system 100 depicted in FIG. 1. For example, in one embodiment, the method 200 is performed by the application server (AS) 190, 175 or 120. In another embodiment, the method 200 is performed by AS 190 in coordination with other components of the system 100, such as broadcast server 194 (for broadcasting various notifications), eNodeBs 111 and 112, and so forth. Alternatively, or in addition, one or more steps, operations or functions of the method 200 may be implemented by a computing device having a processor, a memory and input/output devices as illustrated below in FIG. 4, specifically programmed to perform the steps, functions and/or operations of the method. Although any one of the elements in system 100 of FIG. 1 may be configured to perform various steps, operations or functions of the method 200, the method will now be described in terms of an embodiment where steps of the method are performed by a processor, such as processor 402 in FIG. 4. For example, the processor may comprise a processor of a dedicated application server of a single network operator configured to model data of a service for providing a policy.

The method 200 begins in step 205 and proceeds to step 210. In step 210, the processor creates a model, e.g., a policy model, for modeling data of a service for providing a policy. Step 210 can be deemed as a partial pre-processing step that is performed offline. However, once the model is created and trained, the model can be dynamically retrained and updated. For example, the model can be trained on data associated with a particular type of service, such as a cellular service for generating a policy (e.g., a learned policy) predicted from various "state-action" relationships. For example, the "state" can be represented by the service itself or alternatively can be represented by a plurality of "sub-states" relating to various broad categories associated with the service, e.g., "billing associated with the service," "cost associated with the service," "performance associated with the service," "reliability associated with the service," "security associated with the service," "timely delivery of product or services associated with the service," "customer care associated with the service," and the like. In addition, "actions" can be defined as the drivers of the relevant components pertaining to these states or sub-states such as actions taken for addressing billing (e.g., adjusting the billing cycle for a customer, removing a charge from a bill questioned by a customer, and the like), actions taken for addressing cost (e.g., reducing the cost of a service charged to a customer, reducing a cost in providing the service, offering a new plan to reduce cost for the customer and the like), actions taken for addressing network performance (e.g., sending a test signal to measure performance of a network based component, increasing or instantiating new network based resources, decreasing or removing new network based resources, and the like), actions taken for addressing reliability (e.g., deploying redundant network resources, monitoring maintenance schedules, ensuring replacement of poorly performing network components, and the like), actions taken for addressing security (e.g., maintaining firewalls, updating firewall rules and filters, monitoring for malicious behaviors and attacks, and the like), actions taken for addressing time of delivery (e.g., monitoring scheduled delivery of products and services, monitoring timely onsite visits by technicians, and the like), actions taken for addressing customer inquiries or complaints (e.g., answering concerns or complaints of customers, following up with customers to ensure concerns and complaints are addressed to the customers' satisfaction, determining whether the solutions offered to the customers are appropriate and the like), actions taken for addressing quality of service (e.g., monitoring whether contracted QoS levels are met for each customer, and the like) and so on.

In one embodiment, the policy model can be provided with a training set of data for a particular type of service. For example, the data associated with a cellular service can be obtained from customer care records, maintenance records, operations records such as call detail records, marketing records, customers surveys, and the like. Such data can be categorized into "state-action" relationships that will be applied as training data to the policy model that employs machine learning. In one embodiment, the policy model will provide one or more policies (e.g., a long term reward) that are learned from the training data. For example, the policies may relate to reducing cost (e.g., for customers and/or the service provider), improving the customer's experience, reconfiguring of network based or customer based equipment due to changing conditions, suggesting a new feature for a service, suggesting an entirely new service, presenting an alternate solution to an existing problem, detecting a potentially new problem that has yet to be detected (e.g., a breach in the network security, a pending network failure, and the like). In sum, the policy model is able to learn information across the state-action space to improve various drivers for the service.

In one embodiment, the training data can also be tagged to identify one or more service features, such as privacy feature, security feature, billing feature, performance feature, safety feature and the like. For example, each customer care record may contain a field that identifies the concern of the caller, e.g., the caller is calling to complain about a privacy issue, a security issue, a billing issue, a performance issue, a safety issue and the like. Such tagging of the training data will allow the policy model via machine learning to be able to categorize and extract one or more service features.

In other words, the policy model is able to associate each "state-action" relationship with one or more service features.

In one embodiment, once the policy model is trained in step 210, new first data in step 215 can be continuously provided to the policy model for analysis and/or subsequent retraining. In other words, the policy model is not static and instead is able to be continuously and dynamically retrained with new data. This approach allows the policy model to have the capability to learn and predict new patterns that may forecast potentially new problems that the policy model has yet to detect and encounter.

In step 220, the processor generates a "first" policy for the "first" service. It should be noted that the terms "first" and "second" are used herein to assist the reader to distinguish between different policies and different services and are not intended to impart any limitations to the present disclosure. In fact, there may be additional policies and services greater than the quantity of two (2) as illustratively discussed in FIG. 2. For example, the machine learning of the policy model may deduce from the state-action space that certain actions taken by the service provider resulted in meeting or maximizing a reward. To illustrate, the machine learning may deduce from a large number of customer care records that customers who received a follow up telephone call from a live customer care agent were very unlikely to drop the service when compared to customers who did not receive a follow up telephone call from the live customer care agent for the same problem. The policy model may then generate a new policy for a customer care center to require all customer care agents to call any customer who has experienced this type of problem.

In step 230, the processor implements the first policy. In one example, the first policy is automatically implemented. For example, if the first policy relates to a customer care issue, the first policy can be implemented as a new guideline to be followed by all customer care agents. Alternatively, the first policy can be implemented via an autonomous system, e.g., an interactive voice response (IVR) system. For example, an IVR system can be automatically configured to dial back a customer who had previously experienced a particular problem inquiring whether the customer wishes to speak to a live agent if the problem has not been resolved to his or her satisfaction. When the customer indicates that a subsequent discussion to a live agent is desired, then the IVR system will connect the customer to a live customer care agent. In this example, the generated policy is translated into a feature or function of an autonomous system. Such approach will greatly increase the ability to rapidly update features and functions of autonomous systems to address trending issues that are detected by the policy model. It should be noted that the autonomous system is not limited to an IVR system for a customer care system. For example, the autonomous system may encompass a trouble ticketing system, a network provisioning system, a network maintenance scheduling system, a network resource instantiation controller for a software defined network, and the like.

In step 240, the processor determines whether the first policy is applicable to a second service. For example, the first service may be a cellular service and the second service may be a multimedia content delivery service. In one example, the first policy may entail suggesting that customers who experienced a particular problem should receive a follow up telephone call from a live customer care agent. In this example, the problem may be an interrupted service, e.g., a dropped cellular call that occurred in response to a particular scenario. The processor will determine whether this policy is relevant to another different service. Since the multimedia content delivery service may also experience service interruption, then the first policy will likely produce the same reward projected for the first service as in the second service. It should be noted that it is not required that the first policy must have a direct correlation with the second service before the first policy is applied to the second service. For example, the first policy may relate to sending a text message to a customer's cell phone. However, if the second service relates to a service monitoring HVAC systems via thermostat panels at the customers' sites, then the policy of sending a text message to a customer's thermostat panel would at first glance to be inapplicable since a thermostat panel is not capable of sending or receiving a text message. In contrast to such approach, this first policy may actually cause the second policy model for the service monitoring HVAC systems to possibly put forth a proposed new feature to be offered to its customers, e.g., providing text messaging capability to the thermostat panels. In one embodiment, the decision whether to send the first policy to a second service can be based on the tagged service features associated with the first policy. For example, if the first policy relates to a security or a safety service feature, then the first policy will always be sent to the second service and so on. Such decision can be tailored by the service provider as to how service features will be weighed to provide the decision. Returning to step 240, if the determination is positive, method 200 proceeds to step 250, otherwise the method 200 returns to step 210.

In step 250, the processor applies the first policy to the trained second policy model of the second service. Similar to step 210, the second service will also have a trained policy model similar to the first service while receiving new second data for the second service in step 255. However, unlike step 210, the processor in step 250 will also apply the first policy in the second policy model of the second service. This will allow the machine learning of the second service to leverage the new first policy deduced for the first service. This allows multiple services offered by a single service provider to cross pollinate knowledge learned from one service to be quickly applied to a second different service.

In step 260, the processor generates a "second" policy for the second service. For example, the machine learning of the second policy model may deduce from its own state-action space and the first policy that certain actions taken by the service provider may result in meeting or maximizing a reward. To illustrate, the machine learning may deduce from the first policy and a small number of customer care records that customers who received a follow up telephone call from a live customer care agent were very unlikely to drop the service when compared to customers who did not receive a follow up telephone call from the live customer care agent for the same problem. The second policy model may then generate a new second policy for a customer care center to require all customer care agents to call any customer who has experienced this type of problem. For example, the customer care records for the second service may only have a limited experience on this issue, but combined with the first policy, it may quickly arrive at a similar policy to be implemented in the second service. As this example illustrates, a policy model of a second service using machine learning can be configured to learn from another state to rapidly enhance its own performance.

In step 270, the processor implements the second policy. In one example, the second policy is automatically implemented. For example, if the second policy relates to a customer care issue, the second policy can be implemented as a new guideline to be followed by all customer care agents. Alternatively, the second policy can be implemented via an autonomous system, e.g., an interactive voice response (IVR) system. For example, an IVR system can be automatically configured to dial back a customer who had previously experienced a particular problem inquiring whether the customer wishes to speak to a live agent if the problem has not been resolved to his or her satisfaction. When the customer indicates that a subsequent discussion to a live agent is desired, then the IVR system will connect the customer to a live customer care agent. In this example, the generated second policy is translated into a feature or function of an autonomous system. Such approach will greatly increase the ability to rapidly update features and functions of autonomous systems to address trending issues that are detected by the policy model. Again, the autonomous system may encompass a trouble ticketing system, a network provisioning system, a network maintenance scheduling system, a network resource instantiation controller for a software defined network, and the like.

In step 280, the processor determines whether the second policy is applicable to another service, e.g., the first service or a third service (not shown). It should be noted that the first policy may be the same or different from the second policy depending on the machine learning of the policy model of the respective first and second services. If the first policy is the same as the second policy, then the method will ends in step 295, otherwise the method will return to step 210, where the second policy is provided to the first policy model. For example, the second policy may suggest sending a visual text to be presented on a television display of the customer since the second service provides multimedia content to its customers. Thus, calling the customers may not be the best communication modality for the second service. In other words, the second service applied the knowledge of the first policy through its policy model, but instead deduce for itself a slightly different policy that is more appropriate for the second service. In turn, this second policy can be provided back to the first service which may or may not be impacted by the knowledge of this second policy.

Figure 3:
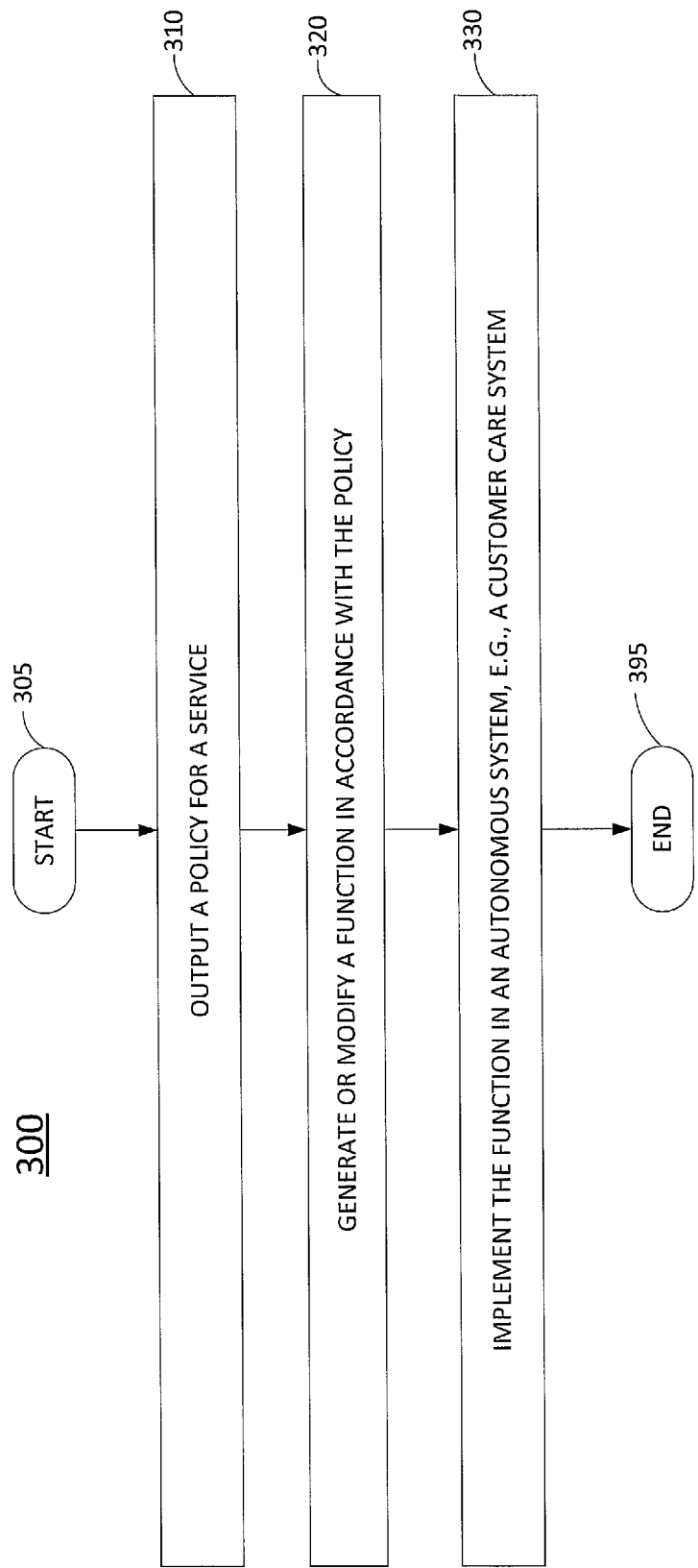
FIG. 3 illustrates a flowchart of an example method for implementing a function in accordance with a policy generated by a policy model in an autonomous system.

FIG. 3 illustrates a flowchart of an example method 300 for implementing a function in accordance with a policy generated by a policy model in an autonomous system. In one embodiment, the steps, operations or functions of the method 300 may be performed by any one or more of the components of the system 100 depicted in FIG. 1. For example, in one embodiment, the method 300 is performed by one of mobile endpoint devices 116 or 117. In another embodiment, the method 300 is performed by other components of the system 100, such as application server 190, 175 or 120, and so forth. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although various elements in system 100 of FIG. 1 may be configured to perform various steps, operations or functions of the method 300, the method will now be described in terms of an embodiment where steps of the method are performed by a processor, such as processor 402 in FIG. 4. For example, the processor may comprise a processor of a mobile endpoint device or an application server.

The method 300 begins in step 305 and proceeds to step 310. In step 310, the processor outputs a policy for a service. For example, step 310 is similar to step 220 or step 250 of FIG. 2.

In step 320, the processor generates or modifies a function in accordance with the policy. For example, if the policy is to provide a new function in a customer care system, e.g., an IVR system, then method 300 may utilize similar software codes to provide a new function consistent with the policy. For example, if an IVR system already has a reminder function for customers who are late with their scheduled payments (e.g., calling each customer with a prerecorded notification to pay a bill), such reminder function can be modified slightly to provide a new "follow-up" function (e.g., calling each customer with a prerecorded notification to inquire whether a previously experienced problem has been resolved to his or her satisfaction). The only change can simply be the prerecorded message and the triggering event for sending the notification. In another example, if the policy indicates that a previously scheduled maintenance or update of a network component needs to be accelerated given a current level of complaints, the method may alter the maintenance schedule directly and inform a maintenance supervisor of the change. In another example, if the policy indicates that a firewall filter needs an immediate update, the method may alter the firewall filter directly and inform a network security supervisor of the change. In this manner, any number of autonomous systems can be automatically updated and reconfigured with a newly generated or modified function based on the generated policy.

In step 330, the processor implements the function in the autonomous system. For example, the method deploys the newly generated or modified function in the autonomous system. Method 300 then ends in step 395.

Thus, the present disclosure provides advances in the field of network management and/or autonomous system modification using machine learning. By converting deduced policies intended for one service to be used by another different service, a policy model using machine learning will learn valuable knowledge from one state that could impact other states. The advantage of the present disclosure allows a single service provider to leverage knowledge learned from one service to be applied rapidly to another service. Additionally, such deduced policy can be used directly to update or reconfigure function of an autonomous system to bring about a rapid response to changing conditions that may impact the various services provided by a single service provider.

Figure 4:
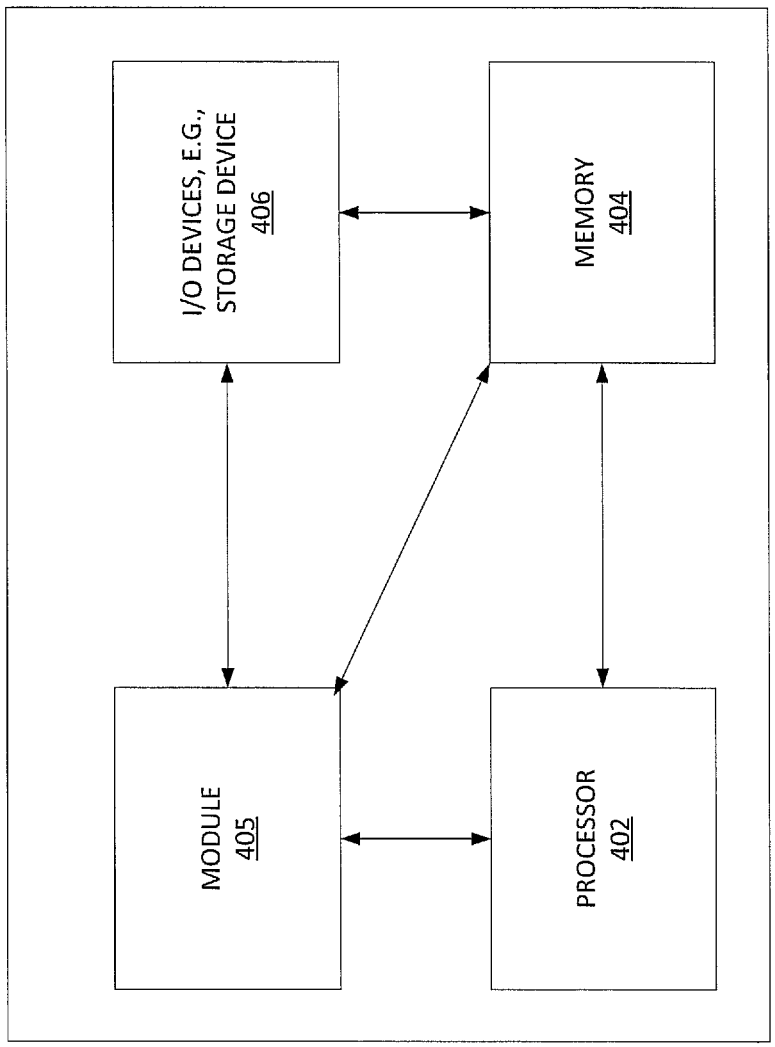
FIG. 4 illustrates a high-level block diagram of a computing device specially configured to perform the functions, methods, operations and algorithms described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for modeling data of a service for providing a policy, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 402 can also be configured or programmed to cause other devices to perform one or more operations as discussed above. In other words, the one or more hardware processors 402 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods. In one embodiment, instructions and data for the present module or process 405 for modeling data of a service for providing a policy (e.g., a software program comprising computer-executable instructions) can be loaded into memory 404 and executed by hardware processor element 402 to implement the steps, functions or operations as discussed above in connection with the illustrative methods 200 and/or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 405 for modeling data of a service for providing a policy (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
    a processor; and
    a computer-readable medium storing instructions which, when executed by the processor, cause the processor to perform operations, the operations comprising:
        generating a first policy for a first service of a network by a first policy model for the first service using machine learning for processing first data of the first service, wherein the first policy defines a first action of the first service;
        determining whether the first policy is to be applied to a second service of the network, wherein each of the first service and the second service comprises at least one of: a landline telephony service, a cellular service, a data service, a multimedia delivery service, a connected car service, or a connected premises service, wherein the first service and the second service are different;
        applying the first policy to the second service when the first policy is deemed to be applicable to the second service, wherein the applying the first policy provides the first policy to a second policy model for the second service using machine learning for processing second data of the second service;
        generating a second policy for the second service, wherein the second policy defines a second action of the second service; and
        implementing the second policy in the second service, wherein the implementing the second policy in the second service comprises generating a function for an autonomous system supporting the second service, wherein the autonomous system comprises a customer care system, wherein the function is inferred from at least one service feature of the first service via the first policy, wherein the at least one service feature comprises at least one of: a privacy feature, a security feature, a billing feature, a performance feature, or a safety feature, and wherein the first service and the second service are provided by a single service provider.

2. The device of claim 1, the operations further comprising:
    determining whether the second policy is to be applied to the first service; and
    applying the second policy to the first service when the second policy is deemed to be applicable to the first service, wherein the applying the second policy provides the second policy to the first policy model.

3. The device of claim 2, wherein the determining whether the second policy is to be applied to the first service is based on a service feature of the second policy.

4. The device of claim 1, wherein the determining whether the first policy is to be applied to the second service is based on at least one of the at least one service feature of the first policy.

5. The device of claim 1, wherein the autonomous system further comprises at least one of: a trouble ticketing system, a network provisioning system, a network maintenance scheduling system, or a network resource instantiation controller for the network, wherein the network comprises a software defined network.

6. The device of claim 1, wherein the machine learning comprises reinforcement learning.

7. A method comprising:
    generating, by a processor, a first policy for a first service of a network by a first policy model for the first service using machine learning for processing first data of the first service, wherein the first policy defines a first action of the first service;

determining, by the processor, whether the first policy is to be applied to a second service of the network, wherein each of the first service and the second service comprises at least one of: a landline telephony service, a cellular service, a data service, a multimedia delivery service, a connected car service, or a connected premises service, wherein the first service and the second service are different;

applying, by the processor, the first policy to the second service when the first policy is deemed to be applicable to the second service, wherein the applying the first policy provides the first policy to a second policy model for the second service using machine learning for processing second data of the second service;

generating, by the processor, a second policy for the second service, wherein the second policy defines a second action of the second service; and implementing, by the processor, the second policy in the second service, wherein the implementing the second policy in the second service comprises generating a function for an autonomous system supporting the second service, wherein the autonomous system comprises a customer care system, wherein the function is inferred from at least one service feature of the first service via the first policy, wherein the at least one service feature comprises at least one of: a privacy feature, a security feature, a billing feature, a performance feature, or a safety feature, and wherein the first service and the second service are provided by a single service provider.

8. The method of claim 7, further comprising:
determining, by the processor, whether the second policy is to be applied to the first service; and
applying, by the processor, the second policy to the first service when the second policy is deemed to be applicable to the first service, wherein the applying the second policy provides the second policy to the first policy model.

9. The method of claim 8, wherein the determining whether the second policy is to be applied to the first service is based on a service feature of the second policy.

10. The method of claim 7, wherein the determining whether the first policy is to be applied to the second service is based on at least one of the at least one service feature of the first policy.

11. The method of claim 7, wherein the autonomous system further comprises at least one of: a trouble ticketing system, a network provisioning system, a network maintenance scheduling system, or a network resource instantiation controller for the network, wherein the network comprises a software defined network.

12. A tangible computer-readable medium storing instructions which, when executed by a processor, cause the processor to perform operations, the operations comprising:
generating a first policy for a first service of a network by a first policy model for the first service using machine learning for processing first data of the first service, wherein the first policy defines a first action of the first service;
determining whether the first policy is to be applied to a second service of the network, wherein each of the first service and the second service comprises at least one of: a landline telephony service, a cellular service, a data service, a multimedia delivery service, a connected car service, or a connected premises service, wherein the first service and the second service are different;
applying the first policy to the second service when the first policy is deemed to be applicable to the second service, wherein the applying the first policy provides the first policy to a second policy model for the second service using machine learning for processing second data of the second service;
generating a second policy for the second service, wherein the second policy defines a second action of the second service; and
implementing the second policy in the second service, wherein the implementing the second policy in the second service comprises generating a function for an autonomous system supporting the second service, wherein the autonomous system comprises a customer care system, wherein the function is inferred from at least one service feature of the first service via the first policy, wherein the at least one service feature comprises at least one of: a privacy feature, a security feature, a billing feature, a performance feature, or a safety feature, and wherein the first service and the second service are provided by a single service provider.

13. The tangible computer-readable medium of claim 12, the operations further comprising:
determining whether the second policy is to be applied to the first service; and
applying the second policy to the first service when the second policy is deemed to be applicable to the first service, wherein the applying the second policy provides the second policy to the first policy model.

14. The tangible computer-readable medium of claim 13, wherein the determining whether the second policy is to be applied to the first service is based on a service feature of the second policy.

15. The tangible computer-readable medium of claim 12, wherein the determining whether the first policy is to be applied to the second service is based on at least one of the at least one service feature of the first policy.

16. The tangible computer-readable medium of claim 12, wherein the machine learning comprises reinforcement learning.

17. The method of claim 7, wherein the machine learning comprises reinforcement learning.

18. The tangible computer-readable medium of claim 12, wherein generating the second policy for the second service comprises generating the second policy for the second service based on at least the first policy and the second policy model.

19. The device of claim 1, wherein generating the second policy for the second service comprises generating the second policy for the second service based on at least the first policy and the second policy model.

20. The method of claim 7, wherein generating the second policy for the second service comprises generating the second policy for the second service based on at least the first policy and the second policy model.

* * * * *